US006309319B1

(12) United States Patent
Moon et al.

(10) Patent No.: US 6,309,319 B1
(45) Date of Patent: Oct. 30, 2001

(54) RECONFIGURABLE POWER SPINDLE

(75) Inventors: Yong-Mo Moon, Ann Arbor; Sridhar Kota, Brighton, both of MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/551,667

(22) Filed: Apr. 18, 2000

(51) Int. Cl.$^7$ ................................ F16H 3/72; F16H 37/06
(52) U.S. Cl. .................................... 475/10; 74/665 A
(58) Field of Search ........................... 475/10; 74/665 A, 74/665 B, 665 C (56) References Cited

U.S. PATENT DOCUMENTS

| | | |
|---|---|---|
| 5,055,087 * | 10/1991 | Koch ........................................ 474/73 |
| 5,316,525 * | 5/1994 | O'Keefe ................................... 475/331 |
| 5,423,726 | 6/1995 | Kota et al. . |
| 5,435,790 | 7/1995 | Kota et al. . |
| 5,551,078 | 8/1996 | Connell et al. . |
| 5,577,973 | 11/1996 | Schmidt . |
| 5,931,757 | 8/1999 | Schmidt . |

OTHER PUBLICATIONS

Kelly, Oliver K., General Motors Corporation. "Design of Planetary Gear Trains" from the SAE paper presented as the 5th L. Ray Buckendale Lecture. pp. 71–76.

* cited by examiner

*Primary Examiner*—Dirk Wright
(74) *Attorney, Agent, or Firm*—Gifford, Krass, Groh, Sprinkle, Anderson & Citkowski, PC

(57) ABSTRACT

A reconfigurable power spindle accommodates different power requirement in an efficient design that conserves time, equipment resources, and physical space. Two or more power sources provide the inputs which can be distributed equally or unequally, as desired, by means of an inventive epicyclic-type gear train (the component gear train). When two or more such component gear trains are arranged in series so that the output of one is connected to the input of the next, the result is a gear train system with as many inputs as the number of the component gear trains plus one. In alternate embodiments, the component gear trains may be arranged in parallel or in a combination of in series and in parallel to create a compound gear train system with a plurality of inputs and one output, and which is still capable of achieving equal contribution power among all the inputs. The design of the component gear train allows for equal power contribution to two input shafts by incorporating into the traditional epicyclic gear train a second (additional) set of planetary gears between the ring gear and the first (traditional) set of planetary gears which are coupled with the sun gear.

21 Claims, 7 Drawing Sheets

Three Inputs

Two Inputs

One Input

RECONFIGURABLE POWER SPINDLE

STATEMENT OF GOVERNMENT RIGHTS

This invention was made at least in part with Government support under NSF Contract No. EEC 9529125. The Government has certain rights to this invention.

FIELD OF THE INVENTION

In general, the present invention relates to machine tool spindles having multiple power inputs and one output, and to gear train systems capable of accommodating multiple power sources driving a single output while allowing variable contribution of power from each power source, including an equal contribution of power.

BACKGROUND OF THE INVENTION

Generally, a machine tool spindle has a fixed power input from a motor and a fixed power output, limiting its use to a certain range of machining operations and loads. There are, however, applications in which a multiple input or a multiple output is desirable, and may be achieved by a differential or similar type of drive system. Differential drive systems are used in automotive applications to drive, from one input-torque shaft, multiple output shafts connected to wheels, such as in the case of four-wheel drive vehicles. Conversely, multiple input shafts may drive a single propeller shaft, such as in fixed wing aircraft, as described in U.S. Pat. No. 4,829,850. Another related application is the use of hybrid transmissions for vehicles, using two- or four-mode input-split electromechanical transmissions, as described in U.S. Pat. Nos. 5,551,078, 5,577,973, and 5,931,757 to Schmidt, the contents of which are incorporated herein by reference.

Many of the conventional multiple input or multiple output differential drive systems require a combination of $2^n$ differentials to provide equal power contribution among the several inputs or outputs, respectively. Greater freedom may be achieved by combining multiple epicyclic gear mechanisms in series, or by combining epicyclic and bevel gear systems, as described in U.S. Pat. Nos. 5,423,726 and 5,435,790, which relate to differential drives with plural or N outputs, respectively. U.S. Pat. Nos. 5,423,726 and 5,435,790 are incorporated herein by reference.

The gear drive mechanisms of the prior art, including those mentioned, are not well-suited to situations in which it is required that the same power spindle performs different machining operations with different power requirements. Nor are existing systems efficient in terms of power use, conservation of resources and reduction of machine set-up time, or space-conservation.

Figure 1:
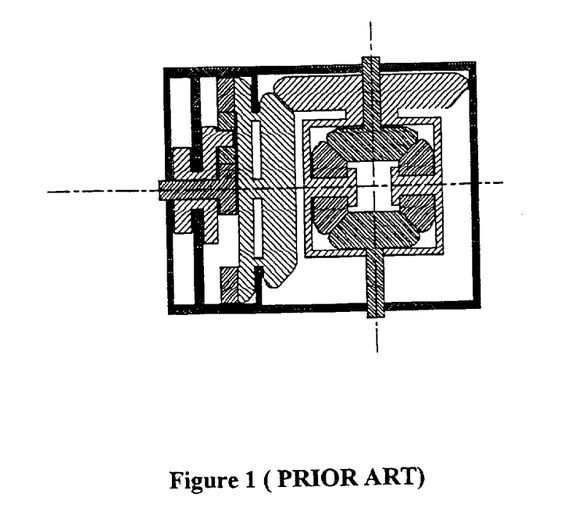
FIG. 1 shows a prior-art gear train with three inputs and one output achieved by combining a prior art epicyclic gear train and a set of bevel gears.

In addition to these considerations, it would also be desirable for the spindle itself to have exactly the power required for any specific operation in a given range of operations, and to be able to modify quickly the power range. The traditional epicyclic gear train consists of a sun gear rotatable about a center axis, one set of planetary gears, an arm or carrier rotatable about the center axis and supporting the planetary gears, and a ring gear rotatable about the center axis. The planetary gears are engaged with the ring gear and the sun gear. This epicyclic gear train may be used for a two-input, one-output application, but the contribution of angular velocity or power between the two inputs cannot be equal. An equal contribution of power is traditionally achieved by employing an additional set of bevel gears at the price of significantly increasing the space requirements, as shown in FIG. 1.

SUMMARY OF THE INVENTION

The subject invention is directed to a reconfigurable power spindle, which is capable of accommodating different power requirements in an efficient design that not only conserves time and equipment resources, but also reduces space requirements. Two or more power sources provide the inputs which can be distributed equally or unequally, as desired, by means of a novel epicyclic gear train (the component gear train). When two or more such component gear trains are arranged in series, so that the output of one is connected to the input of the next, the result is a gear train system with as many inputs as the number of the component gear trains, plus one. This design of the component gear train allows for equal power contribution from the input shafts to the gear train system.

The present invention achieves equal contribution between two inputs of a component gear train by utilizing two sets of planetary gears carried by an arm, so that the gears of first set are engaged with the sun and with the gears of the second set, which are in turn engaged with the ring gear. This dual planetary arrangement can be used to create a reconfigurable power spindle, i.e. a power spindle that can accommodate one or two inputs with a desirable contribution of power. Higher number of inputs can be easily achieved by connecting additional dual gear trains in series, in parallel or in combination to create a compound gear train system, which exhibits the required properties when the gear sizes are properly adjusted.

DETAILED DESCRIPTION OF THE INVENTION

The gear train of the invention is designed to be connected to deliver rotational power to one output shaft through multiple input shafts. Translational power could also be converted to rotational by employing a rack and pinion system. The power can be then distributed in any distribution ratio, including the desirable ratio of 1. Broadly, the invention accomplishes this goal by utilizing two sets of planetary gears instead of one set used in the traditional epicyclic gear train.

Figure 2:
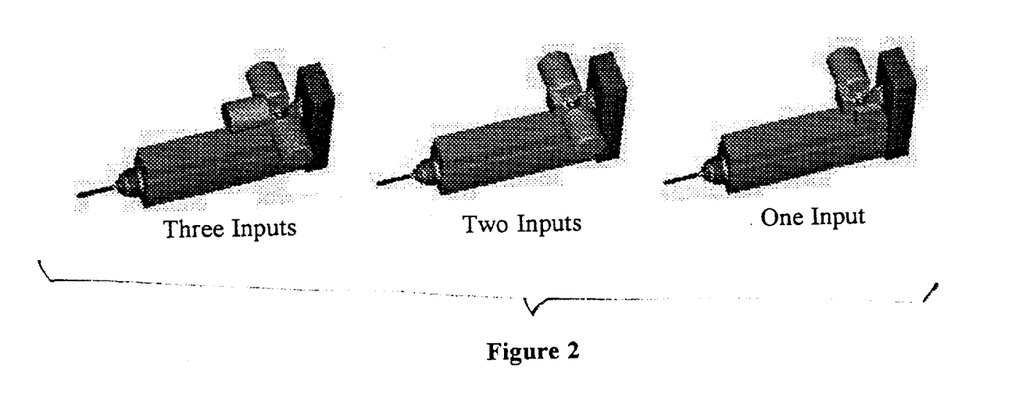
FIG. 2 shows a model of a reconfigurable power spindle which can be used with one, two or three power inputs.
Figure 3:
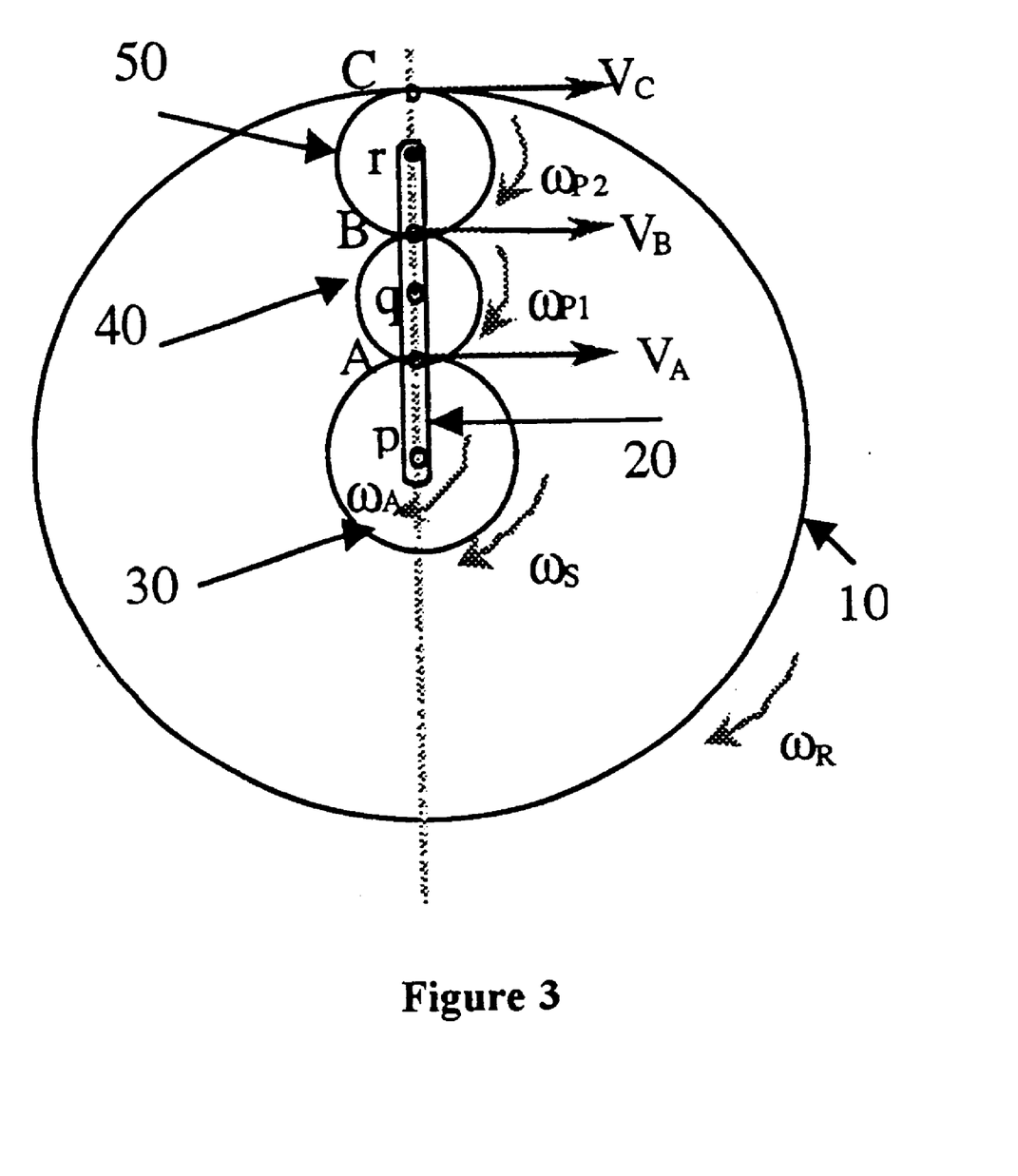
FIG. 3 shows the kinematic diagram of the component gear train incorporating two sets of planetary gears.

FIG. 1 shows a prior-art gear train with three inputs and one output achieved by combining a prior-art epicyclic gear train and a set of bevel gears. FIG. 2 shows a model of a reconfigurable power spindle which can be used with one, two or three power inputs. FIG. 3 shows a kinematic representation of a dual planetary gear train according to the invention (the component gear train), which incorporates a sun gear 30, a ring gear 10, and two sets of planetary gears 40 and 50 attached at different radial positions along an arm or carrier 20. Note that although one planet is shown in each set, three or more planets are typical. The shape of the carrier 20 is not limited to the rectangular shape shown in FIG. 3, and different carrier shapes are best suited to planetary gear sets comprising a plurality of planets, as shown for instance in the embodiment of FIG. 4, which is discussed below.

The planets of the first gear set ("first planets") are engaged with the sun and with the planets of the second gear set ("second planets"), which are also engaged with the ring.

The kinematics of the dual gear train of FIG. 3 leads to the following relation between the angular velocities of the ring gear $\omega_R$, the sun gear $\omega_S$, and the arm $\omega_A$:

$$\omega_R = \frac{\beta \omega_S + \omega_A}{\beta + 1} \quad (1)$$

α and β are defined by the following relations:

$$r_{P1} = \alpha r_{P2} \quad (2)$$

$$r_S = 2\beta(r_{P1} + r_{P2}) \quad (2)$$

$r_{P1}$, $r_{P2}$ are the radii of the first and second planets respectively, and $r_S$ is the radius of the sun gear. Parameter a, therefore, is defined as the ratio of the radius of a first planet over the radius of a second planet, while parameter β is defined as one half of the ratio of the radius of the sun over the sum of the radii of a first and a second planet. From equation (1), it is seen that the relation among the three angular velocities $\omega_R$, $\omega_S$, $\omega_A$ depends only on β. This means that when the ring gear is connected to an output shaft, and the sun and the carrier are connected with one input shaft each, the value of β can be adjusted to obtain a desirable contribution of the input power between the arm and sun. For equal contribution, the value of β is chosen to be 1.

The gear train of FIG. 3 can also be used for a two-output (sun and arm) and one-input (ring) applications. The ratio of the radii of the first and second planets, α, can be used to achieve dynamic or static stability or other desirable characteristics, since it does not affect the power contribution between the arm and the sun, the latter being only affected by β. When only one input is required, the unused input shaft can be locked with a block and the motor ordinarily driving the now disabled shaft may be removed and used in a different application.

Figure 4:
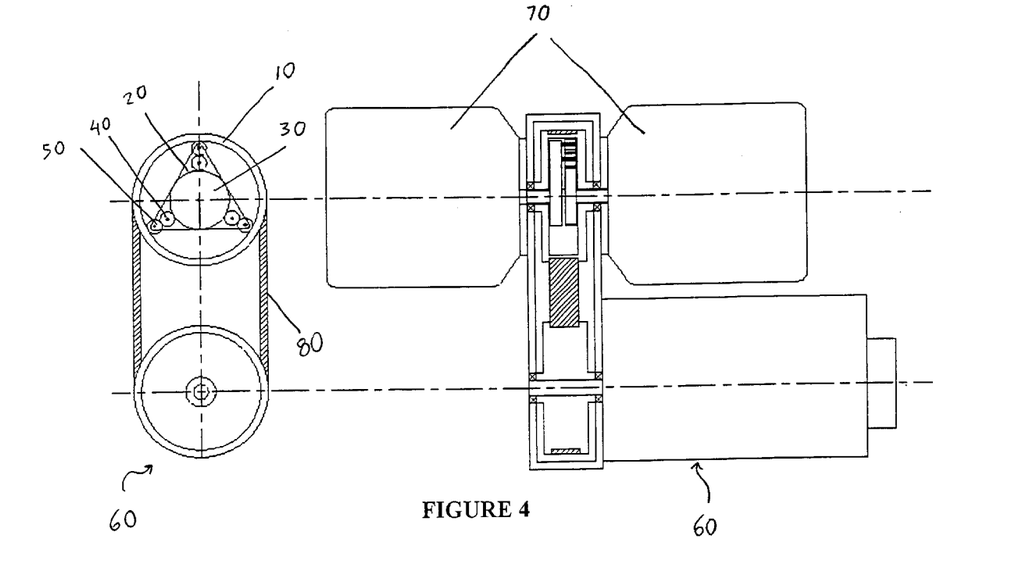
FIG. 4 shows two diagrammatic views of a reconfigurable power spindle for a two-input, one output application.

FIG. 4 shows an embodiment of a component gear train in which the two planetary sets 40 and 50 have three planets each and the carrier 20 has a triangular shape. The component gear train is used in connection with a reconfigurable spindle 60 and two motors 70. The motor inputs are connected to the sun and carrier. The ring gear 10, which is the output, is used as a pulley with a belt 80 to drive the spindle 60. The result is a more compact design.

Several component gear trains of the subject invention can be connected sequentially (in series), so that the output of a preceding gear train is coupled with one of the two inputs of the following gear train. This creates an in-series gear system with one output and any number of inputs, the inputs contributing equal power, if so desired, by adjusting the value of the parameter β in each component gear train. The input shafts may be oriented at different angles to accommodate given space requirements by engaging suitable bevel gears as connectors for adjacent gear trains. The input-output function is also reversible, so that the invention may provide one input and N outputs.

Figure 5:
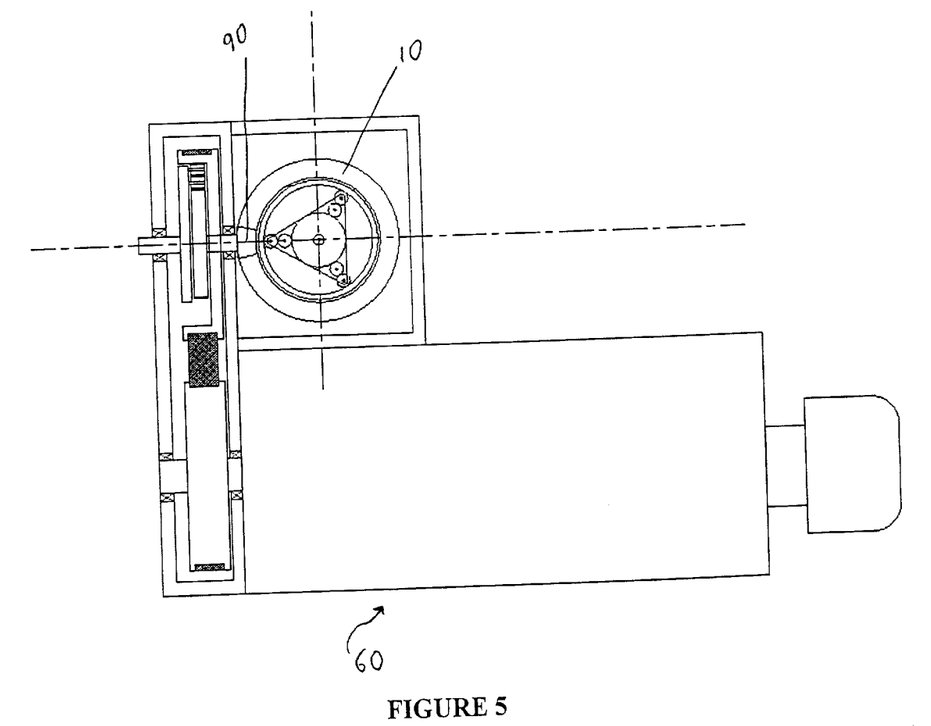
FIG. 5 shows a diagrammatic view of a reconfigurable power spindle for a three-input, one-output application.
Figure 6:
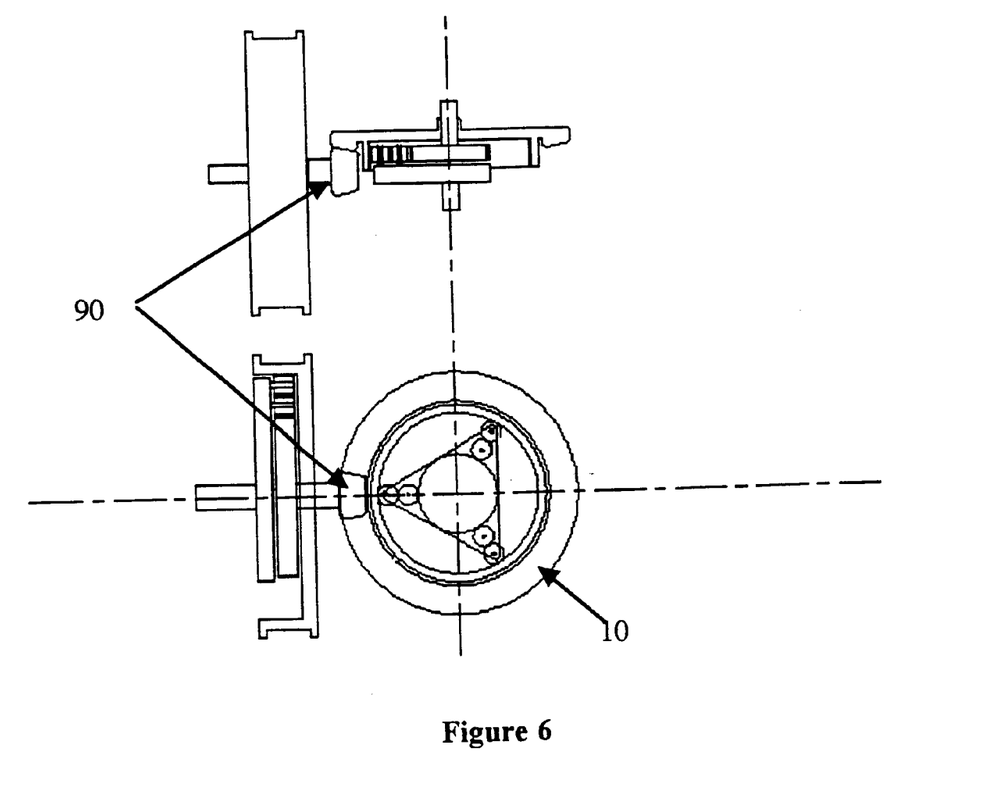
FIG. 6 shows two diagrammatic views of an embodiment of a three-input, one output gear train.

FIG. 5 shows an embodiment of a gear train system having three inputs and one output, the output driving a spindle 60. The gear train system comprises two component gear trains of the present invention coupled in series. A bevel gear 90 connects the ring gear 10 with the sun or arm of the second component gear train. FIG. 6 shows two views of the in-series gear train system without the spindle.

Figure 7:
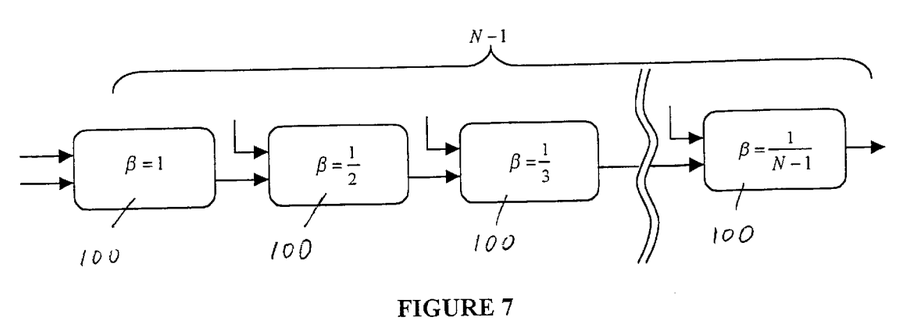
FIG. 7 shows a diagram of a gear train system comprising component gear trains in series and having N inputs and one output.

FIG. 7 shows N−1 serially connected component gear trains 100 (represented by boxes), resulting in N inputs and one output. The values of the parameters, required to achieve equal inputs are 1, ½, ⅓, . . . 1/(N−1) for the first, second, third, . . . (N−1) gear train respectively (equal to the inverse of the serial rank of the corresponding component gear train), provided that the output of the preceding gear train is connected to the arm input of the following gear train. If the preceding output is connected with the following sun input, then the values of β for the sequential gear trains are 1, 2, 3, . . . N−1 (equal to the serial rank of the corresponding gear train).

Figure 8:
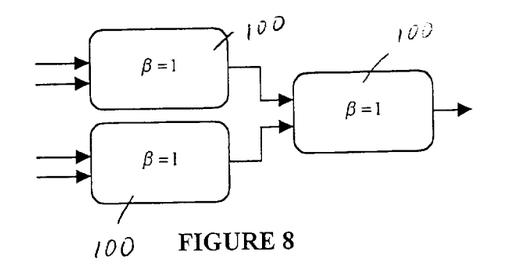
FIG. 8 shows a four-input, one-output embodiment utilizing a gear train system with component gear trains in parallel.

It will be appreciated by a person skilled in the art that a plurality of component gear trains of the present invention may not only be connected in series, as described above, but also in parallel or in a combination of in- series and in-parallel to create a compound gear train system having one output and any number of inputs with equal power contribution, but perhaps with a different space utilization characteristic. For example, a four-input, one-output system, can be obtained either by coupling three component gear trains in series as shown in FIG. 7 with N=4, or by coupling two component gear trains in parallel with a third as shown in FIG. 8. For the first arrangement the values of the parameter β are 1, 2 and 3 (or 1, ½, and ⅓, depending on whether the sun or arm is connected to the preceding output), while for the second arrangement the parameter β is equal to 1 for all three component gear trains.

Figure 9:
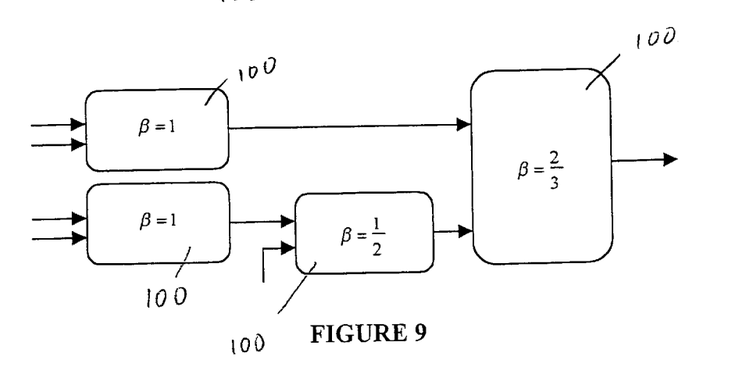
FIG. 9 shows a five-input, one-output embodiment of a compound gear train system utilizing component gear trains in parallel and in series.

FIG. 9 shows a series-parallel combination of four component gear trains resulting in five equal inputs with the values of β shown next to each component gear train. The series arrangement for the same number of inputs is as shown in FIG. 7, but with N equal to 5. Space considerations usually require that the value of β remains close to 1 for each component gear train. The most suitable embodiment for a given application can be chosen by considering the in-series gear system of FIG. 7, which can accommodate both even or odd number of inputs, or an in parallel gear system, such as shown in FIG. 8, for an even number of inputs, or a compound gear system, such as shown in FIG. 9, for an odd number of inputs.

Figure 10:
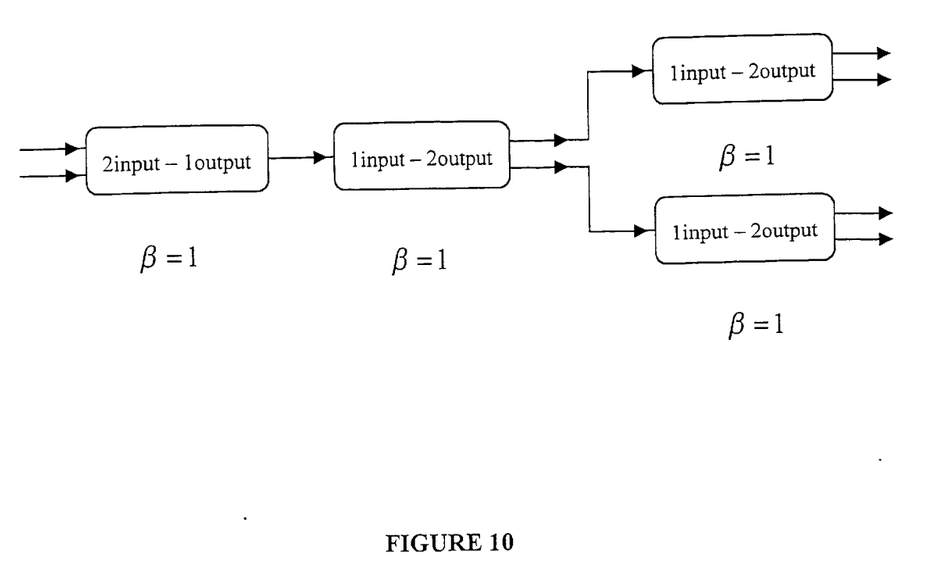
FIG. 10 shows a two-input, four-output embodiment of a compound gear train system.

FIG. 10 shows an embodiment of a compound gear train system, which has two inputs and four outputs. A two-input/one-output component gear train is connected in series with the a one-input/two-outputs component gear train. Each of the outputs of the latter is connected with the input of a one-input/two-outputs component gear train.

We claim:

1. A gear train for coupling first and second rotational inputs to a rotational output, comprising:

a sun gear rotatable about a center axis;

a ring gear independently rotatable about the center axis;

one or more first planetary gears, each meshingly engaged with the sun gear;

one or more second planetary gears meshingly engaged with the ring gear and with one of the first planetary gears; and a carrier rotatable about the center axis and supporting the first and second planetary gears for rotation about their respective axes, whereby the first rotational input is selectively coupled to one of the sun gear, carrier and ring gear, the second rotational input is selectively coupled to a different one of the sun gear, carrier and ring gear, and the rotational output is selectively coupled to the remaining one of the sun gear, carrier and ring gear.

2. The gear train of claim 1, wherein the rotational inputs are coupled to the sun gear and carrier, and the rotational output is coupled to the ring gear.

3. The gear train of claim 2, wherein the ratio of the diameter of the sun gear to the sum of the diameters of the first and second planetary gears is chosen to result in an equal contribution of power from the first and second rotational inputs.

4. The gear train of claim 1, further including a machine tool spindle driven by the rotational output.

5. A gear train for coupling a rotational input to first and second rotational outputs, comprising:

a sun gear rotatable about a center axis;

a ring gear independently rotatable about the center axis;

one or more first planetary gears, each meshingly engaged with the sun gear;

one or more second planetary gears meshingly engaged with the ring gear and with one of the first planetary gears; and a carrier rotatable about the center axis and supporting the first and second planetary gears for rotation about their respective axes, whereby the rotational input is selectively coupled to one of the sun gear, carrier and ring gear, the first rotational output is selectively coupled to a different one of the sun gear, carrier and ring gear, and the second rotational output is selectively coupled to the remaining one of the sun gear, carrier and ring gear.

6. The gear train of claim 5, wherein the rotational outputs are coupled to the sun gear and carrier, and the rotational input is coupled to the ring gear.

7. The gear train of claim 6, wherein the ratio of the diameter of the sun gear to the sum of the diameters of the first and second planetary gears is chosen to result in an equal contribution of power to the first and second rotational outputs.

8. The gear train of claim 7, further including a machine tool spindle driven by one or both of the rotational outputs.

9. In a machine tool spindle having a first input shaft, a second input shaft and an output shaft, the improvement comprising:

an arrangement of spur gears operative to couple the first and second input shafts to the output shaft, such that the power contribution of each input shaft is equal.

10. A machine tool spindle having N input shafts, with N≧3, and one output shaft, comprising:

(N−1) gear trains arranged sequentially as a plurality of intermediate gear trains terminating in a last gear train, each gear train having two inputs and an output, and each gear train being capable of achieving a desirable contribution of power among the inputs, including an equal contribution of power associated with each input, wherein:

a) the output of each intermediate gear train is coupled to one of the inputs of the next gear train in sequence, b) the N input shafts are selectively coupled to the other input of each gear train, and the output of the last gear train is coupled to the output shaft.

11. The machine tool spindle of claim 10, wherein the output of each intermediate gear train is coupled to one of the inputs of the next gear train through the use of a bevel gear.

12. A machine tool spindle having N input shafts, with N≧3, and one output shaft, comprising:

(N−1) gear trains, each gear train having two inputs and an output, each gear train being capable of achieving a desirable contribution of power among the inputs, including an equal contribution of power associated with each input, the gear trains arranged in two rows, each row comprising a plurality of in-series intermediate gear trains terminating in one common last gear train, so that the two rows are coupled in paralell through the last gear train, wherein:

a) the output of each intermediate gear train in a row is coupled to one of the inputs of the next gear train in sequence, b) the N input shafts are selectively coupled to the other input of each gear train, and the output of the last gear train is coupled to the output shaft.

13. The machine tool spindle of claim 12, wherein N is an even number and N≧4 and wherein the two rows comprise an equal number of gear trains.

14. The machine tool spindle of claim 12, wherein N is an odd number and N≧5 and wherein one row has one more gear train than the other row.

15. A gear train system for coupling N rotational inputs, with N≧3, to one rotational output, comprising:

(N−1) gear trains arranged sequentially as a plurality of in-series intermediate gear trains terminating in a last gear train, each gear train having two inputs and an output, and each gear train being capable of achieving a desirable contribution of power among the inputs, including an equal contribution of power associated with each input, wherein the output of each intermediate gear train is coupled to one of the inputs of the next gear train in sequence.

16. A compound gear train system for coupling N inputs, with N≧3, to one output, comprising:

(N−1) gear trains, each gear train having two inputs and an output, each gear train being capable of achieving a desirable contribution of power among the inputs, including an equal contribution of power associated with each input, the gear trains arranged in two rows, each row comprising a plurality of in-series intermediate gear trains terminating in one common last gear train, so that the two rows are coupled in paralell through the last gear train, wherein the output of each intermediate gear train in a row is coupled to one of the inputs of the next gear train in sequence.

17. The compound gear train system of claim 16, wherein N is an even number and $N \geq 4$ and wherein the two rows comprise an equal number of gear trains.

18. The compound gear train system of claim 16, wherein N is an odd number and $N \geq 5$ and wherein one row has one more gear train than the other row.

19. The compound gear train system of claim 16, wherein the inputs and outputs are rotational.

20. The compound gear train system of claim 16, wherein one input is translational.

21. The compound gear train system of claim 16, wherein one input is an internal combustion engine, a Stirling engine, or an electric motor.

* * * * *